No. 613,170. Patented Oct. 25, 1898.
A. L. McLANE.
FILTER.
(Application filed Dec. 10, 1897.)
(No Model.)
FIG. 1.
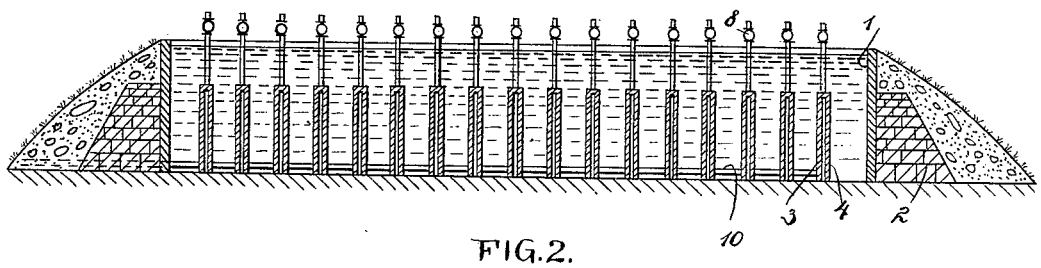
FIG. 2.
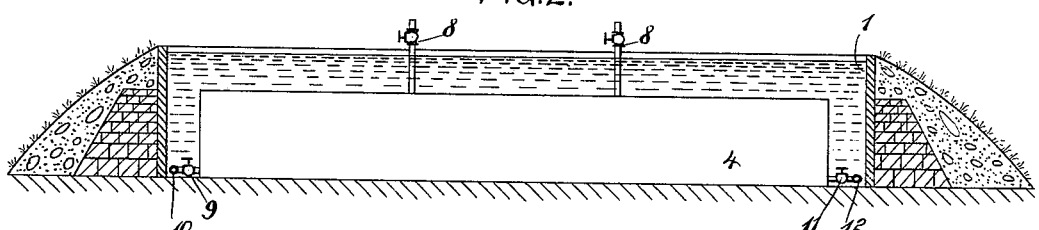
FIG. 4.
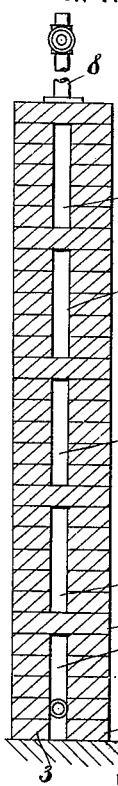
FIG. 3.
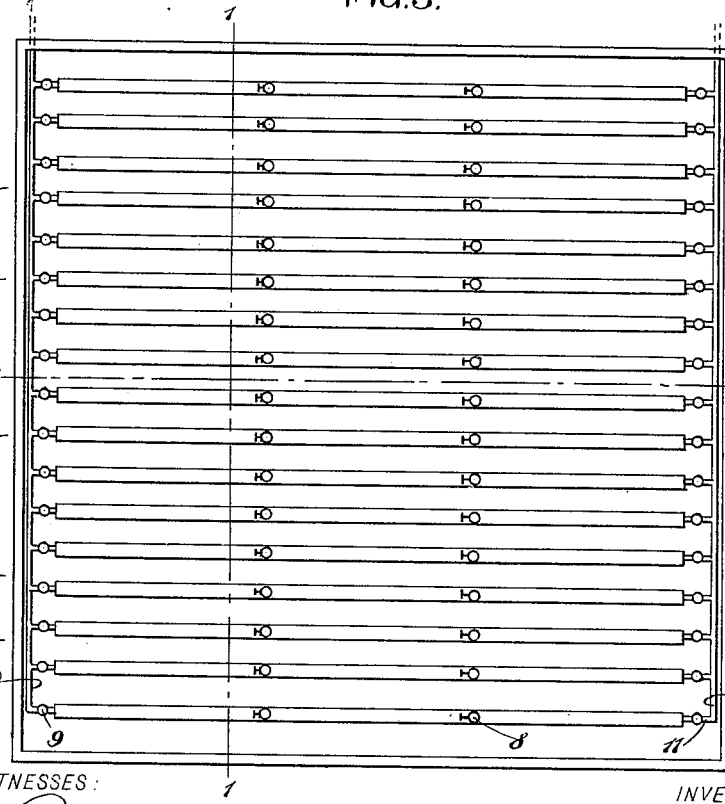
FIG. 5.
FIG. 6.
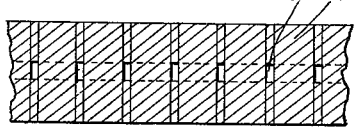
WITNESSES:
Donn Twitchell
C. R. Ferguson
INVENTOR
A. L. McLane
BY
ATTORNEYS.
THE NORRIS PETERS CO., PHOTO-LITHO., WASHINGTON, D. C.

UNITED STATES PATENT OFFICE.

ALBERT L. McLANE, OF LAREDO, TEXAS.

FILTER.

SPECIFICATION forming part of Letters Patent No. 613,170, dated October 25, 1898.

Application filed December 10, 1897. Serial No. 661,371. (No model.)

*To all whom it may concern:*

Be it known that I, ALBERT L. MCLANE, of Laredo, in the county of Webb and State of Texas, have invented new and useful Improvements in Filters, of which the following is a full, clear, and exact description.

This invention relates to filters for purifying water received from ponds, reservoirs, and the like; and the object is to provide a filter that shall be comparatively cheap to build and to maintain in a clean and operative condition.

I will describe a filter embodying my invention and then point out the novel features in the appended claims.

Reference is to be had to the accompanying drawings, forming a part of this specification, in which similar characters of reference indicate corresponding parts in all the views.

Figure 1 is a section on the line 1 1 of Fig. 3 of a filter embodying my invention. Fig. 2 is a section on the line 2 2 of Fig. 3. Fig. 3 is a plan view. Fig. 4 is a sectional elevation of one of the filtering devices. Fig. 5 is a vertical section at right angles to Fig. 4, and Fig. 6 is a transverse section of one of the filtering devices.

Referring to the drawings, 1 designates a water-tight tank or basin of any suitable size, and designed to be placed in the ground and supported, if necessary, by an abutment-wall 2. Arranged in the basin is a series of filters, each consisting of side walls 3 4 and closed at the ends and top. The side walls are spaced apart to form chambers 5, and the several chambers of a filter have communication one with another through spaces 6 between the tie-bricks 7.

The whole filter is constructed of porous material—such, for instance, as porous brick.

Extended from the upper chamber of each filter is one or more pipes 8, provided with valves, which are to be left open when the filter is in operation, so as to allow the exit of air, and thus permit the filling of the filters with water. These pipes 8 extend above the water-level of the basin. At the lower portion and at one end each filter has a valve-controlled pipe connection 9 with a main pipe 10, leading to a clear-water basin or well, and at the other end each filter has a valve-controlled pipe connection 11 with a service-pipe 12, leading from a suitable head-pressure.

The space between the filters is to be sufficient to allow a person to walk between them in order to clear the basin or to close the valves in any number of the pipes 9 to throw any desired number of the filters into or out of use. When the filter is in operation, the valves of the several pipes 11 must be closed. They are only to be opened when it is desired to clean out the filters by flushing. At such time the valves in the pipes 8 are to be closed.

In operation the basin is to be filled from any desired source and the several filters entirely submerged. The water will filter through the porous material and enter the chambers 5, from which it will discharge through the pipe 10.

It is obvious that by providing the valve connections any number of the filters may be cleaned while others are in operation.

Having thus described my invention, I claim as new and desire to secure by Letters Patent—

1. The combination with a basin, of a series of filters each having porous walls and chambers, a discharge-pipe with which each of the filters has a valve-controlled connection, and a flushing or service pipe with which each of the filters has a valve-controlled connection, substantially as specified.

2. The combination with a basin, of a series of chambered porous filters designed to be submerged in the basin, an air-outlet pipe leading from a chamber of each filter and extended above the water-level in the basin, and an outlet-pipe common to all the filters, substantially as specified.

3. The combination with a basin, of a series of chambered porous filters designed to be submerged in the basin, an air-outlet pipe leading from the upper portion of each filter, an outlet-pipe having a valve-controlled connection with each of the filters, and a flushing-pipe having a valve-controlled connection with each of the filters, substantially as specified.

ALBERT L. McLANE.

Witnesses:
E. A. ATLEE,
D. H. FLY.